United States Patent [19]
Gopalan et al.

[11] Patent Number: 5,734,772
[45] Date of Patent: Mar. 31, 1998

[54] INVERTED DOMAIN STRUCTURE IN FERROELECTRIC CRYSTALS WITH POLARIZATION IN THE CRYSTAL PLANE

[75] Inventors: Venkatraman Gopalan, Rochester; Mool C. Gupta, Webster, both of N.Y.

[73] Assignee: Eastman Kodak Company, Rochester, N.Y.

[21] Appl. No.: 685,133

[22] Filed: Jul. 24, 1996

Related U.S. Application Data

[60] Provisional application No. 60/005,171, Oct. 13, 1995.
[51] Int. Cl.$^6$ ........................................ G02B 6/10
[52] U.S. Cl. .................... 385/122; 385/122; 385/10; 385/37
[58] Field of Search .................... 359/290, 322; 835/15, 10, 37, 40, 8, 9, 31, 39–42, 50, 122

[56] References Cited

U.S. PATENT DOCUMENTS

| | | | |
|---|---|---|---|
| 5,488,681 | 1/1996 | Deacon et al. | 385/37 |
| 5,491,762 | 2/1996 | Deacon et al. | 385/37 |
| 5,581,642 | 12/1996 | Deacon et al. | 385/10 |
| 5,586,206 | 12/1996 | Brinkman et al. | 385/37 |

OTHER PUBLICATIONS

Kiyoshi Nakamura and Hiroshi Shimizu, "Poling of Ferroelectric Crystals by Using Interdigital Electrodes and its Application to Bulk-Wave Transducers" pp. 527–530, IEEE Ultrasonics Symposium, 1983.

H. Seibert and W. Sohler, "Ferroelectric Microdomain Reversal on Y-cut LiNbO$_3$ Surfaces", SPIE vol. 362, *Physical Concepts of Materials for Novel Optoelectronic Device Applications II: Device Physics and Applications*, 1990, p. 370.

R.A. Rubino, D.E. Bossi, and J.D. Farina, "A Novel Thermal Poling Technique for Fabricating QPM SHG Structures in X-cut Lithium Tantalate" in *Compact Blue–Green Lasers Topical Meeting*, 1992, Optical Society of America, Washington, D.C., 1992, vol. 6, pp. 75–77.

*Primary Examiner*—John Ngo
*Attorney, Agent, or Firm*—Raymond L. Owens

[57] ABSTRACT

Ferroelectric domain regions are formed in a ferroelectric crystal cut so that the polarization direction is in the plane of the crystal and is along the z direction is disclosed. A periodic ion exchange grating on the surface of the crystal with grating is provided on the surface of the crystal with grating lines parallel to the Z-axis of the crystal by a combination of photolithography and ion-exchange techniques and then applying a uniform field across two electrode pads on the crystal surface, thus creating an electric field opposite to the polarization direction (+Z direction) of the crystal. The electric field reverses the domains in selective regions defined by the ion exchange grating formed in the earlier step. This gives rise to a periodically reversed domain grating on the crystal surface.

10 Claims, 6 Drawing Sheets

INVERTED DOMAIN STRUCTURE IN FERROELECTRIC CRYSTALS WITH POLARIZATION IN THE CRYSTAL PLANE

CROSS REFERENCE TO RELATED APPLICATIONS

The present application is related to U.S. application Ser. No. 08/268,373, filed Jun. 29, 1994, still pending, by Mool C. Gupta and Alan C. G. Nutt, and entitled "Ferroelectric Light Frequency Doubler Device With a Surface Coating and Having an Inverted Domain Structure" and U.S. application Ser. No. 08/686,134, filed Jul. 24, 1996, still pending, by Mool C. Gupta, Alan C. G. Nutt, and Venkatraman Gopalan, and entitled "Ferroelectric Crystal Having Inverted Domain Structure".

This application claims the benefit of U.S. Provisional Application No. 60/005,171, filed Oct. 13, 1995.

FIELD OF THE INVENTION

The present invention relates to devices and a method of making them wherein the devices use inverted ferroelectric domain structures.

BACKGROUND OF THE INVENTION

Commercially available ferroelectric crystals have a uniformly poled electric field domain extending within the crystals between an upper and a lower crystal surface. Such uniform domains do not provide the so-called phase matching properties of the crystal for arbitrary wavelength of light which are required for efficient operation of a ferroelectric light frequency doubler device. In order to provide phase matching in such uniformly poled crystals, various approaches have been developed to generate spatially periodically arranged zones of inverted polarity so that distinct zones with a periodicity of alternating polarity of the domains are provided within the crystal.

Among the approaches useful for generating polarity inverted zones are electron beam exposure, ion beam exposure, proton exchange followed by heat treatment, and inverting some regions of a uniformly prepoled crystal by repoling with an applied electric field.

DISCUSSION OF BLUE LIGHT

Using these periodic domain gratings, various devices such as frequency conversion lasers, acousto-optic devices, piezoelectric and pyroelectric devices have been made in ferroelectric materials.

A feature of the ferroelectrics such as $LiNbO_3$, $LiTaO_3$ and KTP is that they exhibit non-linear optical properties like second harmonic generation. When a light of infrared wavelength (say 840 nm) is passed through these crystals in specific orientations, they generate light of double the frequency of the input light (in this case, 420 nm blue light). The efficiency of conversion of the infrared to blue light depends on the non-linear coefficients of the materials, the length of the material traversed, and most importantly, the relative phase velocities of the infrared and the blue light in the material. If these two velocities are different, then the infrared and the blue light keep getting in and out of phase with each other and there is little net conversion of infrared light to blue light. Although the non-linear coefficient of these materials is high, the phase velocities of infrared and blue lights is different. Phase matching of specific wavelength of infrared light can be achieved by passing infrared light along specific orientation of the crystal. However, if the infrared light travels across a periodically domain reversed grating, the phase velocity mismatch can be overcome to result in high conversion efficiencies of infrared to blue. The period of domain reversed grating can be chosen to phase match arbitrary wavelength of infrared light.

$LiNbO_3$, $LiTaO_3$ and KTP have been used with periodic domain inversion for development of new lasers using frequency conversion technique. These crystals have been poled in Z direction (thickness direction) by applying voltage along z direction or by writing by e-beam on negative Z face. The waveguides formed by proton exchange process in $LiNbO_3$ or $LiTaO_3$ can only support TM polarization, wherein incident beam polarization is along z direction. Laser diodes used for frequency conversion are TE polarized (polarization along the horizontal direction). To use TM polarization, laser diode has to be 90 degree rotated. For laser array application, 90 degree rotation is not practical and it is desired to have waveguide which can support TE polarization.

PREVIOUS WORK IN POLING X-CUT AND Y-CUT CRYSTALS

It is a problem to fabricate a periodic domain grating on X-cut and Y-cut crystals. Some of the main difficulties in this area have been (a) in electric field poling, applying very high fields (~20 KV/mm) on the crystal surface without the breakdown of medium between the electrodes on the surface; (b) requiring high temperature processes for domain reversal; (c) not sufficient depth of the domain reversed regions (only ~0.2 µm) in the thickness direction of the crystal; (d) inability to fabricate domain gratings with very small periods (~3–4 µm); and (e) involved processes requiring long times and cost of fabrication.

Nakamura and Shimizu (see Kiyoshi Nakamura and Hiroshi Shimizu, "Poling of Ferroelectric Crystals by Using Interdigital Electrodes and its Application to Bulk-Wave Transducers" p 527–530, IEEE Ultrasonics Symposium, 1983) reported domain reversal in X-cut and Y-cut lithium tantalate crystals using interdigital electrodes on the surface and heating the sample above its Curie temperature (~600° C.) and subsequent cooling. The grating was used for acousto-optic device. One fundamental problem with this technique is that one cannot achieve a periodic reversed grating useful for frequency conversion. Secondly, the sample was heated above the Curie temperature where the ferroelectricity is lost. On cooling down, only selected areas where electric field is applied regains a single domain orientation. The other areas remain multidomain which means the polarization points in all random directions in these areas.

Seibert and Sohler (see H. Seibert and W. Sohler, "Ferroelectric Microdomain Reversal on Y-cut $LiNbO_3$ Surfaces", SPIE vol. 362, *Physical Concepts of Materials for Novel Optoelectronic Device Applications II: Device Physics and Applications*, 1990, p 370) used pyroelectric fields developed on the surface of the $LiNbO_3$ crystals on heating and cooling the crystal rapidly, to reverse domains in selected areas near the surface. Two metal pads were formed on the surface of a Y-cut crystal with a gap of ~6 µm between them. Upon heating to high temperatures and cooling down rapidly, a field is developed between the two metal pads which is opposite to the polarization direction and hence reverses the domain orientation between the pads. With this technique, they demonstrated domain gratings of 6.5 µm period. The main drawbacks of this technique are that the depth of the reversed domains were very shallow (<0.5 μm). Further, high temperature operation is required with rapid heating and cooling rates which is undesirable. The grating period demonstrated is still too large for making a quasi-phase matched blue laser.

Recently Rubino et al (see R. A. Rubino, D. E. Bossi, and J. D. Farina, "A Novel Thermal Poling Technique for Fabricating QPM SHG Structures in X-cut Lithium Tantalate" in *Compact Blue-Green Lasers Topical Meeting*, 1992, Optical Society of America, Washington, D.C., 1992, vol. 6, pp 75–77) reported fabricating a ~9 μm period domain grating on X-cut LiTaO$_3$ by a combination of electric field and thermal heating. Two electrodes with a spacing of 200 μm were deposited on the surface of the crystal and a field of 1 KV/mm was applied across them. Using a laser beam of ~10.6 μm wavelength, the crystal was heated in selected areas to temperatures above 600° C. which is the Curie temperature of LiTaO$_3$. While cooling under the applied field, the domain in that region reverses its polarization direction. They also fabricated a waveguide across a third order domain grating and obtained an efficiency of ~3%/W-cm$^2$. Although the efficiency is low, this was the first reported blue laser device on X-cut LiTaO$_3$. The problems with this technique are that (a) one requires a sophisticated laser and a scanning mechanism; (b) crystal requires heating to over 600° C.; (c) the domain were crescent shaped and difficult to control and (d) only third order grating (~9 μm) period was demonstrated. Smaller periods are difficult with this technique.

SUMMARY OF THE INVENTION

It is therefore an object of the invention to provide an improved method for making inverted ferroelectric devices with reversing or inverting domain regions.

Another object of this invention is to provide a waveguide structure with a periodic grating which can effectively convert IR light to blue light.

The above objects are achieved in a method of forming ferroelectric domain regions in a ferroelectric crystal cut so that the polarization direction (Z direction) is in the X-cut or Y-cut plane of the crystal, comprising the steps of:

a) forming a periodic ion exchange grating on the surface of the crystal with grating lines parallel to the Z-axis of the crystal by a combination of photolithography and ion-exchange techniques; and b) providing a uniform electric field opposite to the polarization direction (+Z direction) of the crystal, the electric field being adapted to reverse the domains in selective regions defined by the ion exchange grating formed which thereby provides periodically reversed domain grating on the crystal surface.

A scanner device, comprising:

a) a ferroelectric crystal cut so that the polarization direction (Z direction) is in the X-cut or Y-cut plane of the crystal;

b) a waveguide structure formed in the ferroelectric crystal including:

i) a beam steering prism formed in the crystal and having a polarization in a first direction with the crystal surrounding the prism having a polarization in a direction opposite to that of the beam steering prism; and c) means for varying the electric field across the prism to increase the refractive index of the prism to steer a beam which is being guided through the waveguide.

The scanner device is integrated with the blue light generating device in such a way that the blue light generated from the first device passes through the scanner and can be steered at the output.

ADVANTAGES

It is an advantage of the present invention to provide a method for formation of periodic domain inversion in plane so that laser diode array can be used for nonlinear frequency conversion and single laser diode does not need to be rotated 90. It is another advantage of the invention to provide a structure which can be used for laser array applications wherein 90 degree rotation is not practical and it is desired to have waveguide which can support TE polarization.

Other important features and advantages of this invention are:

a) the distinction between the regions where domain reversal is required versus the regions where it is not required can be controlled by controlling the ion-exchange processing conditions;

b) the reversed domain depth can be controlled by the magnitude of the elctric field applied over the coercive field required to reverse the domains in the crystal. Typical depths of 2–10 μm can be obtained which are deep enough for waveguide devices; and c) domain reversal grating of a period of a few microns can be fabricated.

DETAILED DESCRIPTION

Figure 1:
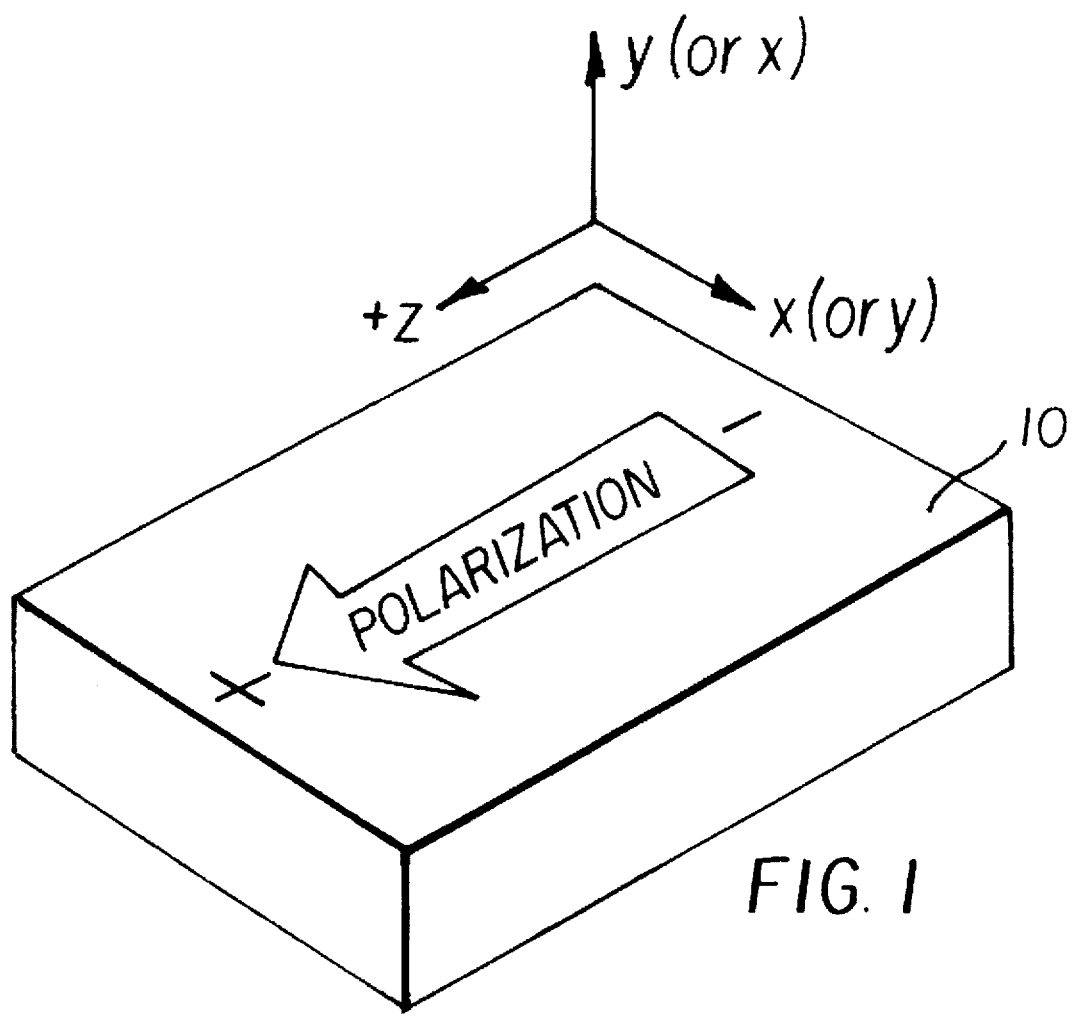
FIG. 1 shows the crystal orientation used and the polarization direction with respect to crystal axes.

FIG. 1 shows a ferroelectric crystal 10 which is X- or Y-cut. The term X-cut, for example, means that the crystal surface is perpendicular to the X-axis of the crystal. The term Y-cut similarly means that the crystal surface is perpendicular to the Y-axis. In the X-cut situation, the top crystal plane is called the X-plane or surface and with a Y-cut, the top crystal plane is called the Y-plane or surface. Either can be used effectively in accordance with this invention. It is an important feature of this invention that the intrinsic ferroelectric polarization direction (defined as being along the Z-axis of the crystal) is in the plane of the crystal. The direction of polarization is indicated by the wide arrow in FIG. 1 and the "+" and the "−" signs indicating the signs of the dipole charges giving rise to the polarization in the crystal. Typical crystal dimensions which can be used in accordance with this invention are: thickness t: 0.5 mm, width along Z-axes: 10 mm, width perpendicular to Z-axis: 10 mm. The thickness, t, and the width along the Z-axis are not critical. The width perpendicular to the Z-axis determines the final length of the device and hence the device efficiency. Various ferroelectric materials such as LiTaO$_3$, LiTaO$_3$, and KTP can be used in accordance with this invention.

Figure 2A:
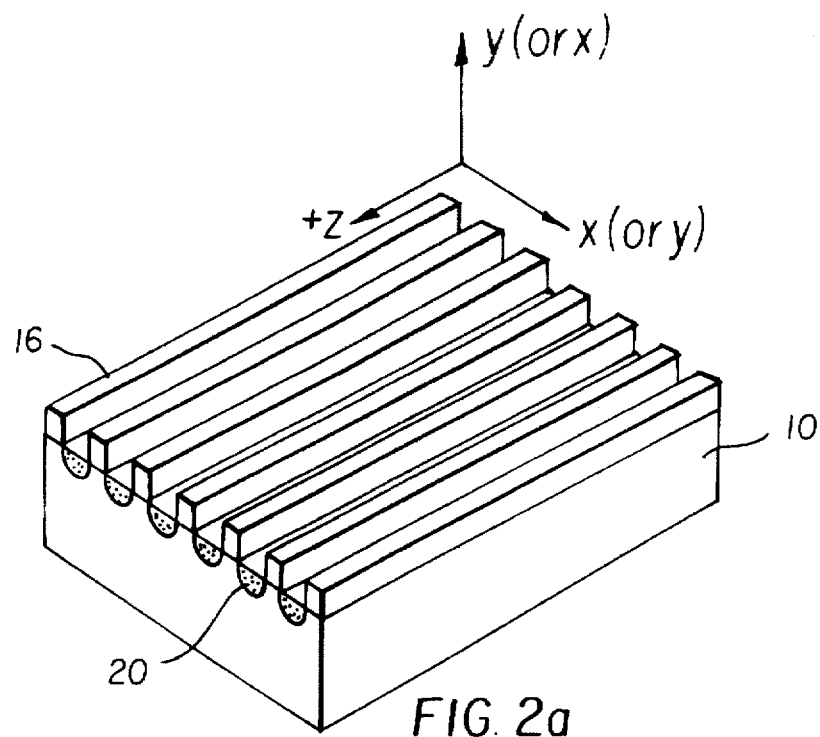
FIG. 2a shows forming barrier metal lines on the crystal surface and ion-exchanging the crystal between the metal lines.
Figure 2B:
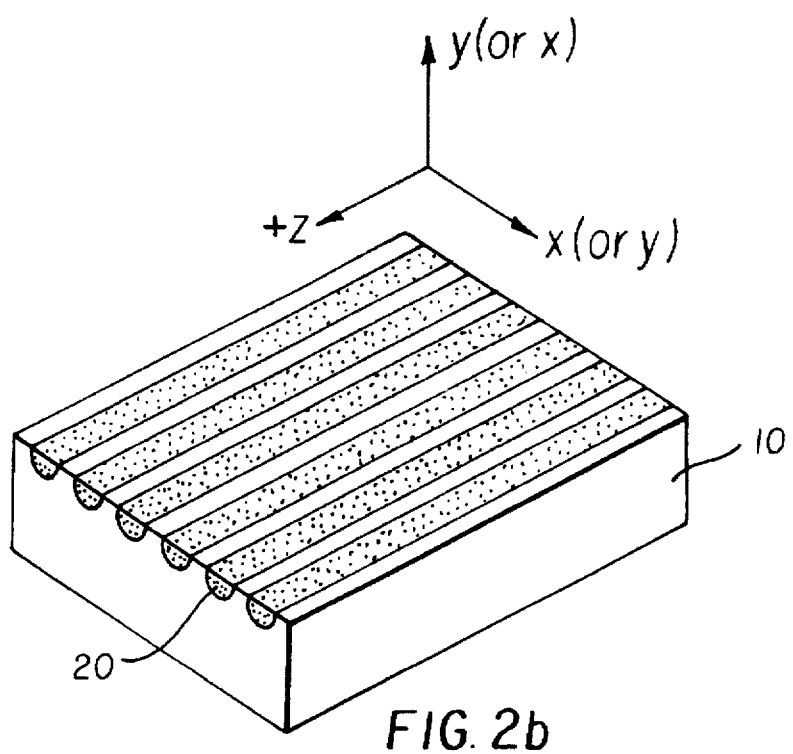
FIG. 2b shows stripping the metal mask away, leaving behind an ion exchange grating.

The first step in the domain grating formation process is to form a barrier metal grating 16 on the crystal 10 surface as shown in FIG. 2. The metal fines must be parallel to the Z direction of the crystal surface. This is done using standard photolithographic lift-off techniques involving (a) coating a photoresist layer on top of the crystal surface (b) baking and then exposing the photoresist to ultraviolet light through a physical mask followed by developing to form photoresist lines of desired periodicity (c) coating a barrier metal film on top of the photoresist pattern by deposition techniques such as electron-beam, RF-magnetron sputtering, or thermal evaporation, and finally (d) dissolving the photoresist lines using a proper solvent such as acetone and consequently lifting off the metal on top of the photoresist lines. This leaves behind a metal grating between the original photoresist lines. The next step to form an ion exchange grating 20 in the areas between the metal lines where the crystal is exposed. This process involves dipping the crystal in appropriate exchange solutions and heating it at a fixed temperature for desired amount of time. For example, a ~50 nm thick tantalum metal mask is formed on LiNbO$_3$ and LiTaO$_3$ crystals. The crystals are then immersed in benzoic acid with 0.1 to 1 mole percent lithium benzoate, and heated to 200°–300° C. for 1–10 hours. This changes the dielectric properties of the crystal in the ion exchanged areas compared to the regions that are protected by tantalum metal. Finally, on stripping the barrier metal off the crystal surface using a chemical etch, we have an ion exchange grating 20 on the crystal surface as shown in FIG. 2b. In LiTaO3 Y-cut crystals used for quasi-phase matched blue light generation of 420 nm wavelength from an infrared beam of 840 nm, the period of domain grating required is $\Lambda=3.6$ µm.

Figure 3A:
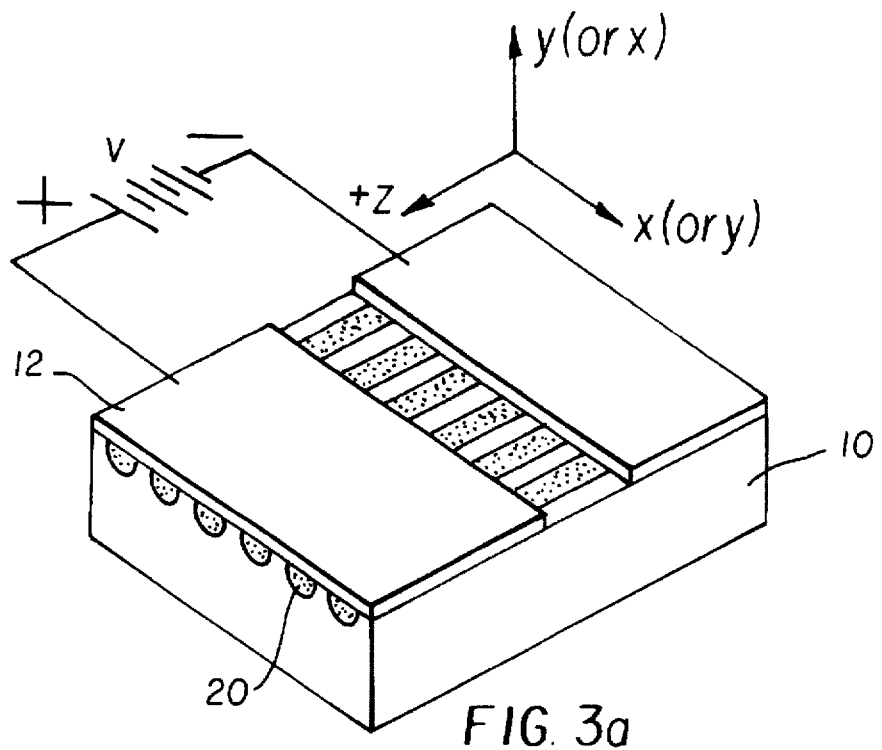
FIG. 3a shows the electric field poling process using two conducting pads on the crystal surface and applying a voltage.

The next step is the formation of domain inverted grating on the crystal 10 surface using electric field application. First, two conducting electrode pads 12 on the crystal surface are deposited as shown in FIG. 3a. These can be any metal such as aluminium, gold, silver, tantalum, etc. or a conducting oxide. The gap between the pads is typically ~0.5 mm or smaller. The edges of the elctrode pads on either side of this gap are perpendicular to the Z direction of the crystal.

Now a high voltage is applied across this gap as shown in FIG. 3a by a symbolic battery carrying the letter V for voltage. The polarity (+ and −) of the two pads 12 shown are such that the electric field created between the pads 12 is pointing in a direction opposite to the polarization direction (+z direction) of the crystal. Therefore, the polarization direction of the crystal between the two electrode pads 12 can be reversed. Typical electric fields required for the domain reversal process in LiTaO$_3$ and LiNbO$_3$ are ~20 KV/mm. This requires a voltage of ~10 KV across a 0.5 mm gap between the electrodes. In order to prevent the breakdown of air around the crystal which typically requires only ~1.6 KV/mm, special care has to be taken to avoid any air path between the two pads shorter than ~10 mm. This can be achieved by either submerging the entire electric field poling setup in high dielectric breakdown oils (such as silicone oil) or by sealing the gap between the two pads by high dielectric breakdown materials such as silicone robber, polymethyl methacrylate (PMMA) etc.

The ion exchange grating of FIG. 2b provides selectivity in the domain reversal process upon application of the electric field. If the applied voltage is chosen correctly, in LiTaO$_3$, the polarization in the regions between the ion-exchanged (with protons i.e. H$^+$ ions) regions in the crystal can be reversed first without reversing the polarization within the ion-exchanged regions. It shall be understood that in general, depending on the type and conditions of ion exchange grating formed on the crystal, the domain reversal may take place in the ion-exchanged region or between the ion exchanged regions. This shall depend on the nature of changes that the ion-exchange process causes on the dielectric properties of the crystal which may increase or decrease the coercive field in the crystal required for domain reversal.

Figure 3B:
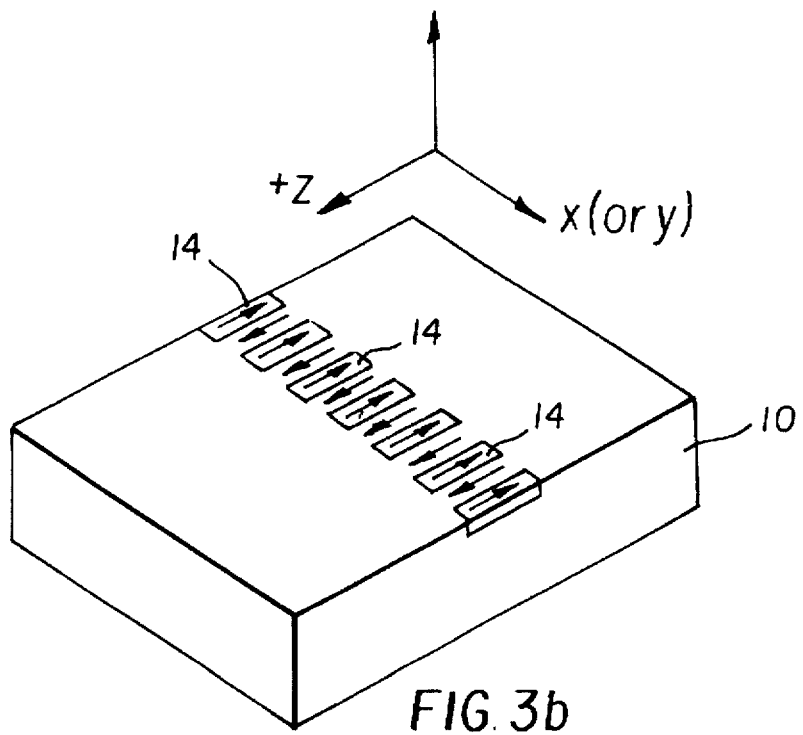
FIG. 3b the domain grating formed in the crystal after metal pads and ions in the ion-exchange regions are removed.

Next, the electrode pads 12 are stripped off the crystal surface and the ion exchange grating 20 is destroyed by heating the crystal at high temperatures (350°–500° C.) for an extended time (12–24 hrs). We now have a crystal with a periodic domain reversed grating 14 on its surface as shown in FIG. 3(b). The depth of the domain reversed regions in LiTaO$_3$ can vary from 3 µm–10 µm depending on the ion-exchange depth and the applied voltage.

Figure 4A:
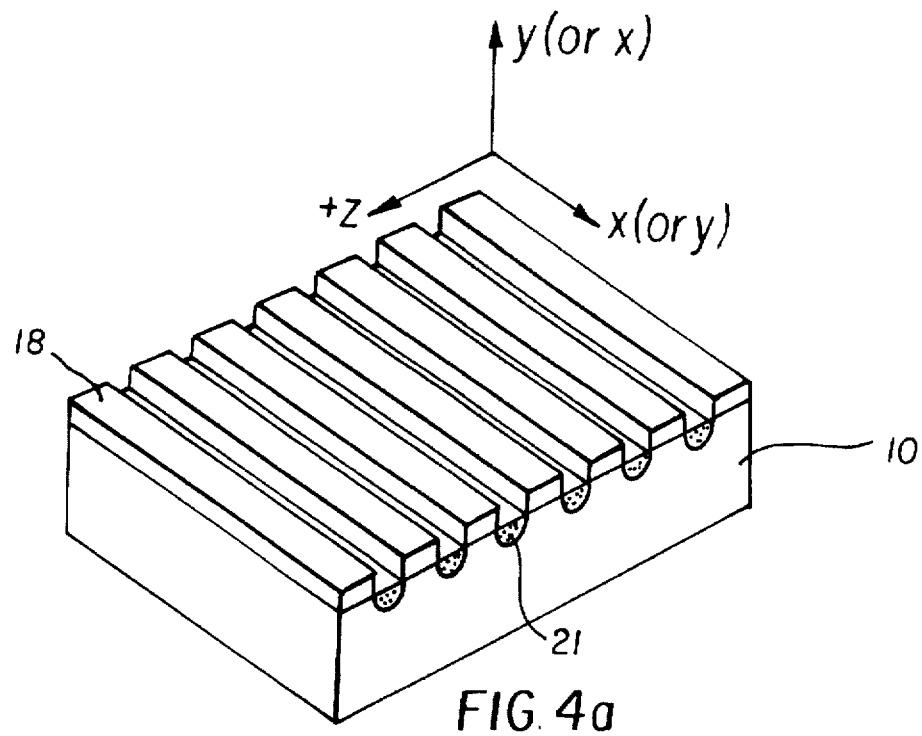
FIG. 4a and 4b show the waveguide formation on the inverted domain regions by lithography.
Figure 4B:
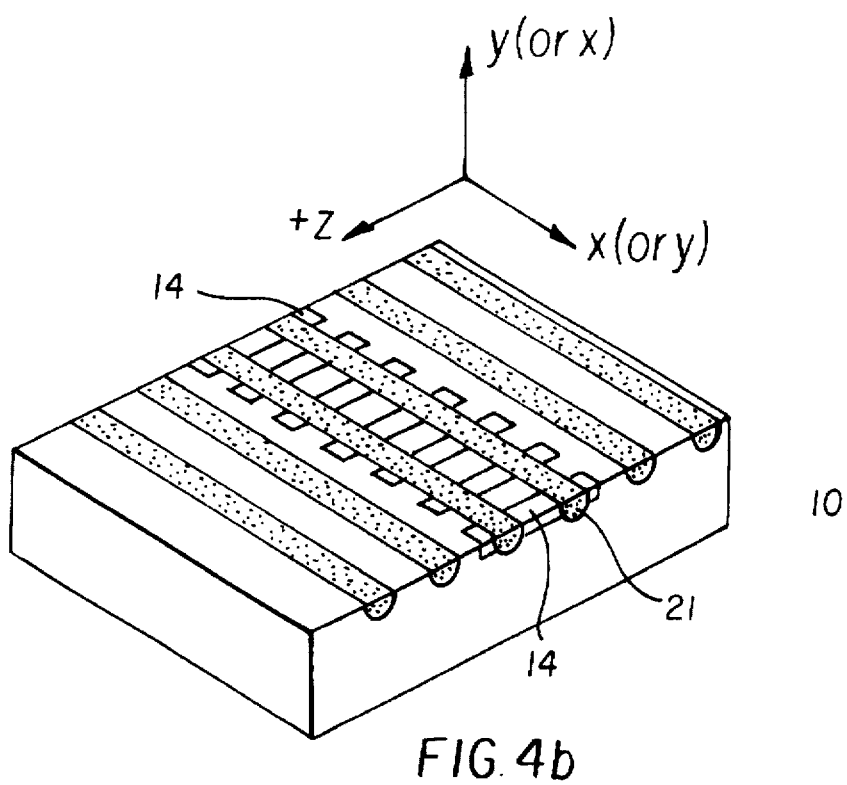

Having obtained a periodic domain grating 14, light guiding waveguides are fabricated on the crystal surface perpendicular to the polarization direction as shown in FIG. 4a and FIG. 4b. The first step is to strip the conductive electrode pad 12 from the crystal surface which can be performed by chemical etching using appropriate chemicals or by physically removing the conductive electrode pad 12 by polishing. Next tantalum metal film 18 is deposited on the entire crystal surface by rf-magnetron sputtering. Typically, this metal grating 16 can have a thickness of 50 nm. Although tantalum is used, it will be understood that other barrier materials can also be used in forming the waveguide mask. Using standard photolithographic technique of photoresist coating, baking, UV-exposure of the resist through a physical mask, developing the resist followed by argon ion etching to remove tantalum metal between the photoresist lines and then stripping the photoresist off, a tantalum grating is created on the crystal surface with grating lines perpendicular to the polarization axis of the crystal as shown in FIG. 4a. This structure is next ion-exchanged in areas between the tantalum lines where the crystal surface is exposed. This process involves dipping the crystal in appropriate exchange solutions and heating it at a fixed temperature for desired amount of time. For example, when LiTaO$_3$ crystals are immersed in benzoic acid with 0.1 to 1 mole percent lithium benzoate and heated to 200°–300° C. for 1–10 hours, excellent results are achieved. This increases the refractive index of the crystal in the ion exchange grating 21 compared to the regions that are protected by tantalum metal film 18. The waveguide is indeed provided by the ion exchange grating 21. Finally, the tantalum metal film 18 is stripped off the crystal surface using a chemical etch, and edges are polished for a waveguide device as shown in FIG. 4b. The areas of the crystal that are of interest are where the periodic domain reversed grating 14 and the ion exchange grating 21 cross each other. In operation IR light is guided by ion exchange grating 21 across the periodic system to produce blue light. It is a particular feature of this invention that, after the formation of periodic domain inversion, a laser diode array can be used for nonlinear frequency conversion and single laser diode does not need to be rotated 90 as discussed in the background of the present invention.

In an example of this invention, a Y-cut LiTaO3 crystal was cut into a small dimension of 10 mm×10 mm. An ion exchange grating was formed on the crystal surface as follows: Using the photolithographic lift-off technique described before, tantalum metal lines were formed on the crystal surface which were 5 µm wide and 5 µm spaced. Ion exchange was carried out by either submerging the crystal in pyrophosphoric acid for 2 min at 200° C. or in benzoic acid with 0.1 mole % lithium benzoate at 250° C. for 2 hrs. The tantalum grating was stripped off by dipping the crystal in a mixture of hydrofluoric acid+nitric acid (1:2 ratio) for a few seconds at room temperature. Next two tantalum metal films 12 were deposited on the crystal surface as conducting electrodes. The gap between the electrode pads was 0.5 mm. The voltage was applied by clamping the sample in between two high dielectric breakdown rubber sheets. This way, a voltage of up to 12–13 KV could be applied without air breakdown. Since the domain reversal is accompanied by a current pulse, the current through the sample was measured. In this case, the currents were in the nano amperes range. A voltage of −8.5 to 9 KV was sufficient to obtain a domain grating with a depth of ~2 µm.

Figure 5A:
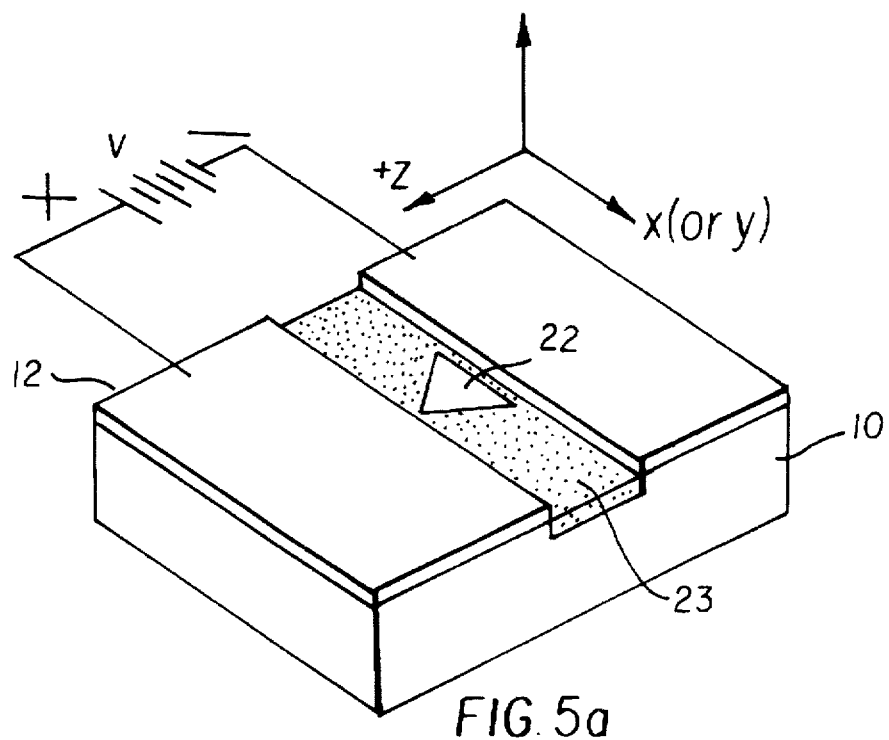
FIG. 5a and FIG. 5b show specific steps in making device in accordance with the invention.
Figure 5B:
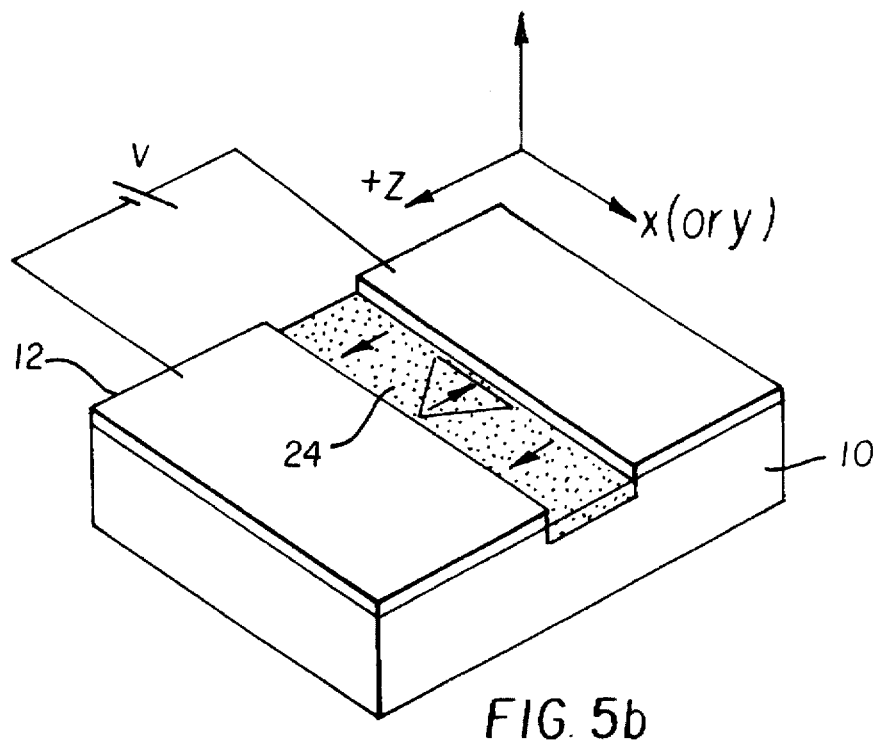

The periodic domain reversed grating process illustrated in FIG. 4a and FIG. 4b and disucssed above can be used to fabricate a second harmonic generation device and can generate blue light with an infrared input. This is called frequency doubling. The frequency doubling device can be integrated with a scanner made on the same crystal. The scanner consists of a beam steering device formed in the crystal in a certain geometric fashion. An example of the scanner geometry is shown in FIG. 5a and FIG. 5b. Using the same lithographic techniques as described with reference to FIG. 2a, the surface region 23 is ion exchanged except for a geometric area 22 (in this case triangle cross section) on the surface of the crystal as shown in FIG. 5a. Next, the two electrodes 12 are deposited and a voltage is applied so that only the crystal area inside the geometric area 22 undergoes a polarization reversal. It may be noted that the above process works for LiTaO₃ and LiNbO₃ crystals where the ion exchange process involves H⁺ ions. In general, this structure can be applied to other materials with a different ion exchange process or a process where only the geometric area 22 is ion exchanged and the surroundings are not ion exchanged. The important concept is to change the dielectric constant of the geometric area 22 with respect to its surroundings such that upon applying an electric field using electrodes 12 we obtain a structure with polarization in the geometric area antiparallel to its surroundings. Further, it will be appreciated that while the figures depict this geometric area 22 as a prism with a triangular cross section, other geometries could be used for the beam steering process without deviating from the basic principle of this invention, namely, difference in the refractive indices between the geometric area and its surroundings created through difference in the sign of electro-optic coefficients in the two areas. Thus, when an electric field of correct polarity is applied across the Z-axis of the crystal, the index along the Z-axis increases in the geometric area with respect to its surroundings, thereby steering a light beam that passes through the prism. Next, the entire area is ion exchanged in order to make a planar light guiding waveguide 24 as shown in FIG. 5b.

Figure 6:
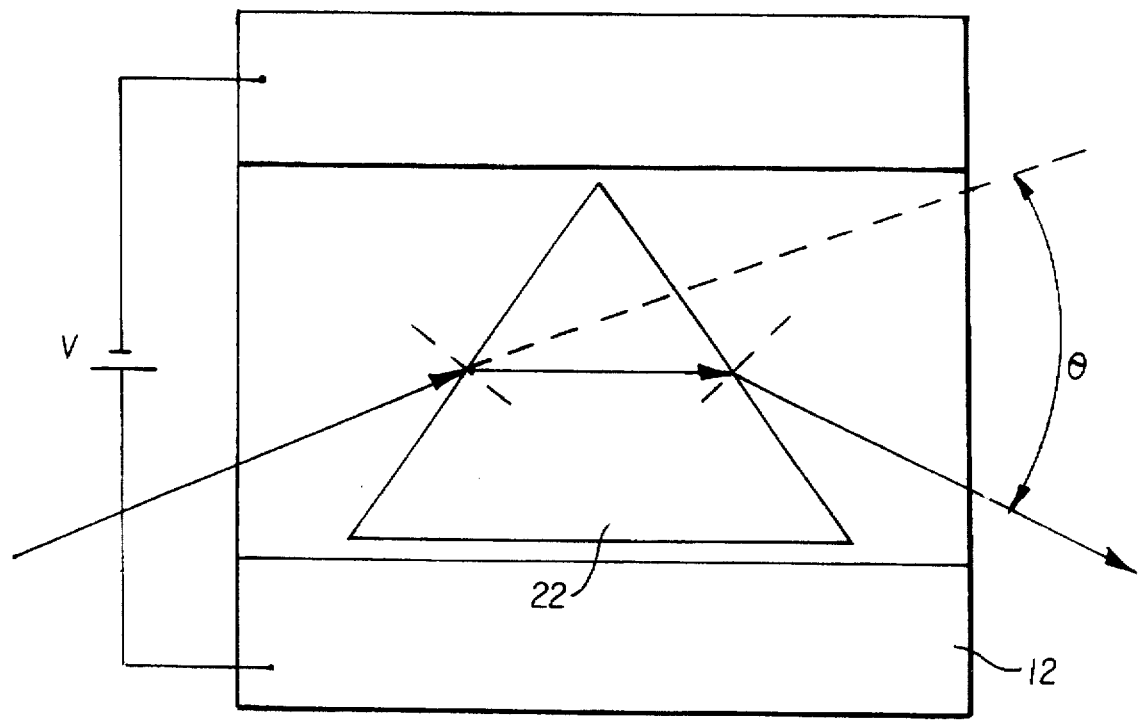
FIG. 6 shows the operation of the scanner device of FIG. 5a and FIG. 5b.

Summarizing, when a voltage is applied across the geometric polarization reversed area 22, through the electro-optic effect, the refractive index along the Z-axis increases in the triangle area 22 while it decreases outside the triangle area 22. When light is guided through the waveguide 24 and passes through the prism, it is deflected by an angle θ as shown in FIG. 6. This angle θ can be controlled by controlling the voltage across the electrodes. This scanner device can be integrated with the blue light generated by the device shown in FIG. 5b by fabricating both devices on the same crystal.

The invention has been described with reference to a preferred embodiment. However, it will be appreciated that variations and modifications can be effected by a person of ordinary skill in the art without departing from the scope of the invention.

PARTS LIST 10 ferroelectric crystal
12 conductive electrode pad
14 periodic domain reversed grating
16 metal grating
18 tantalum metal film
20 ion exchange grating
21 ion exchange grating
22 geometric area
23 ion exchanged surface
24 waveguide

We claim:

1. A method of forming ferroelectric domain regions in a ferroelectric crystal cut so that the polarization direction is along the Z-axis in the X-cut or Y-cut plane of the crystal, comprising the steps of:
   a) forming a periodic ion exchange grating on the surface of the crystal with grating lines parallel to the Z-axis of the crystal by a combination of photolithography and ion-exchange techniques; and
   b) providing a uniform electric field opposite to the polarization direction (+Z direction) of the crystal, the electric field being adapted to reverse the domains in selective regions defined by the ion exchange grating formed which thereby provides periodically reversed domain grating on the crystal surface.

2. The method according to claim 1 wherein the crystal is formed of LiTaO₃ or LiNbO₃ or KTP.

3. A method of forming a waveguide structure having ferroelectric domain regions in a ferroelectric crystal cut so that the polarization direction is along the Z-axis in the X-cut or Y-cut plane of the crystal, comprising the steps of:
   a) forming a periodic ion exchange grating on the surface of the crystal with grating lines parallel to the Z-axis of the crystal by a combination of photolithography and ion-exchange techniques;
   b) providing a uniform electric field opposite to the polarization direction (+Z direction) of the crystal, the electric field being adapted to reverse the domains in selective regions defined by the ion exchange grating formed which thereby provides periodically reversed domain grating on the crystal surface; and
   c) forming a waveguide in the crystal perpendicular to the periodic domain grating.

4. The method of claim 3 wherein the ion exchange grating is formed by a combination of photolithography and ion-exchange techniques.

5. The method of claim 3 further including illuminating the input of the waveguide with infrared radiation so that blue light exits from the waveguide.

6. The method according to claim 3 wherein the crystal is formed of LiTaO₃ or LiNbO₃ or KTP.

7. A waveguide structure having ferroelectric domain regions in a ferroelectric crystal cut so that the polarization direction is along the Z-axis in the X-cut or Y-cut plane of the crystal, comprising:
   a) a periodic ion exchange grating on the surface of the crystal with grating lines parallel to the Z-axis of the crystal by a combination of photolithography and ion-exchange techniques;

b) the domains on the surface of the crystal being reversed in selective regions defined by the ion exchange grating formed to thereby provide periodically reversed domain grating on the crystal surface; and c) a waveguide formed in the crystal perpendicular to the periodic domain grating.

8. A scanner device, comprising:

a) a ferroelectric crystal cut so that the polarization direction is along the Z-axis in the X-cut or Y-cut plane of the crystal;

b) a waveguide structure formed in the ferroelectric crystal including:

i) a beam steering prism formed in the crystal and having a polarization in a first direction with the crystal surrounding the prism having a polarization in a direction opposite to that of the beam steering prism; and c) means for varying the electric field across the prism to increase the refractive index of the prism to steer a beam which is being guided through the waveguide.

9. The scanner of claim 8 wherein the prism has a triangular cross section.

10. The scanner of claim 8 further including a frequency doubling device formed in the ferroelectric crystal and including:

d) a periodic ion exchange grating on the surface of the crystal with grating lines parallel to the Z-axis of the crystal by a combination of photolithography and ion-exchange techniques;

e) the domains on the surface of the crystal being reversed in selective regions defined by the ion exchange grating formed to thereby provide periodically reversed domain grating on the crystal surface; and f) a waveguide formed in the crystal perpendicular to the periodic domain grating.

* * * * *